(12) United States Patent
Tanigawa et al.

(10) Patent No.: US 11,886,459 B2
(45) Date of Patent: Jan. 30, 2024

(54) DATA MANAGEMENT SYSTEM AND DATA MANAGEMENT METHOD

(71) Applicant: Hitachi, Ltd., Tokyo (JP)

(72) Inventors: Keiko Tanigawa, Tokyo (JP);
Toshihiko Kashiyama, Tokyo (JP);
Jumpei Okoshi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 53 days.

(21) Appl. No.: 17/694,194

(22) Filed: Mar. 14, 2022

(65) Prior Publication Data

US 2022/0391404 A1 Dec. 8, 2022

(30) Foreign Application Priority Data

Jun. 4, 2021 (JP) .................... 2021-094821

(51) Int. Cl.
*G06F 17/00* (2019.01)
*G06F 16/25* (2019.01)

(52) U.S. Cl.
CPC .................. *G06F 16/254* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| 8,688,625 | B1 * | 4/2014 | Clark | G06Q 10/00 707/602 |
| 2004/0254948 | A1 * | 12/2004 | Yao | G06F 16/254 |
| 2004/0260696 | A1 * | 12/2004 | Matsuoka | G06Q 10/10 707/999.005 |
| 2011/0055147 | A1 * | 3/2011 | Joerg | G06F 9/4843 707/602 |
| 2013/0238596 | A1 * | 9/2013 | Mandelstein | G06F 16/254 707/716 |
| 2016/0352707 | A1 * | 12/2016 | Belyy | H04L 63/061 |
| 2017/0068595 | A1 * | 3/2017 | Nautiyal | G06F 16/254 |
| 2017/0104627 | A1 * | 4/2017 | Bender | H04L 47/765 |
| 2017/0351717 | A1 * | 12/2017 | Kabra | G06F 16/1748 |
| 2017/0371949 | A1 * | 12/2017 | Le Biannic | G06F 16/2455 |
| 2018/0150529 | A1 * | 5/2018 | McPherson | G06F 9/542 |
| 2018/0181650 | A1 * | 6/2018 | Komatsuda | G06F 16/214 |
| 2022/0114190 | A1 * | 4/2022 | Pattar | G06F 16/25 |

FOREIGN PATENT DOCUMENTS

JP 2018-106400 A 7/2018
WO WO 2018/011895 A1 1/2018

* cited by examiner

*Primary Examiner* — Hung D Le
(74) *Attorney, Agent, or Firm* — Crowell & Moring LLP

(57) ABSTRACT

A data management system includes a processor. An estimated ETL level mapping processing unit is operated on the processor to estimate existence of unregistered ETL that is ETL not registered in a repository, to calculate a degree of similarity based on matching between an existing data model and retained data, and to extract a column to be a candidate based on the degree of similarity. The existence of the unregistered ETL is estimated by estimating the presence or absence of connectedness in the ETLs on the basis of correspondence between input data and output data in ETLs by using an execution ETL log relevant to an execution history of the ETL.

11 Claims, 20 Drawing Sheets

F I G. 3
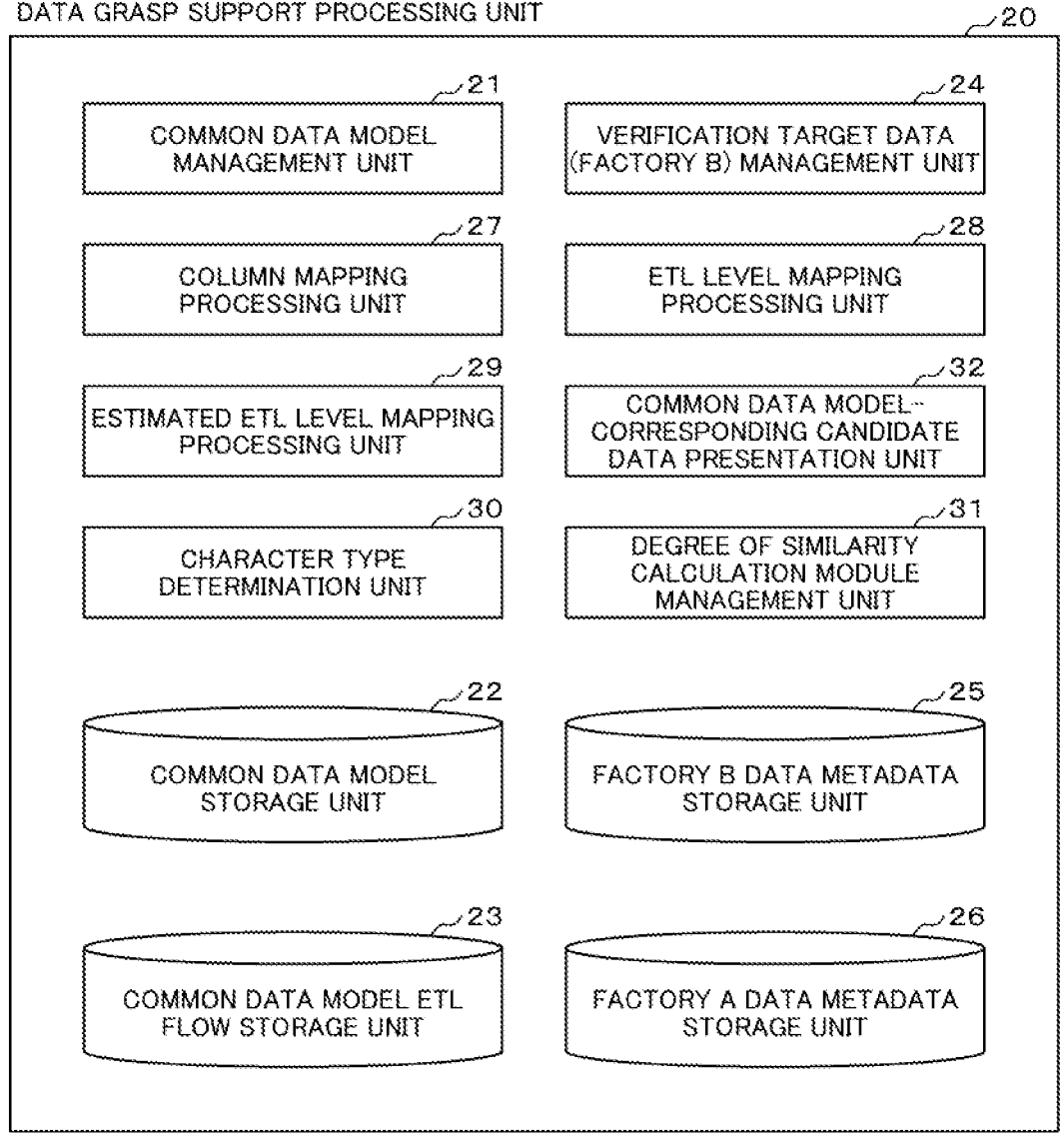

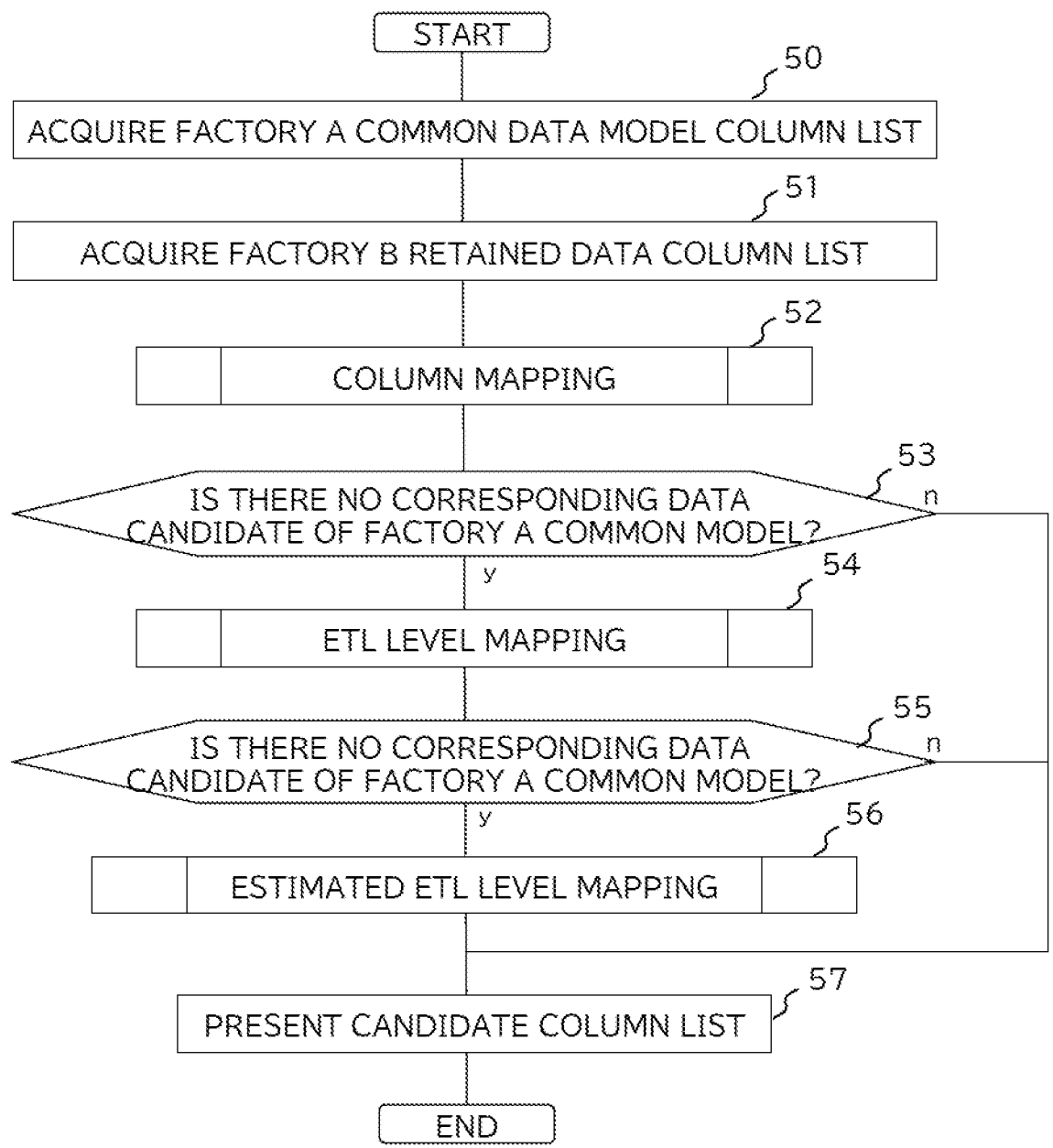

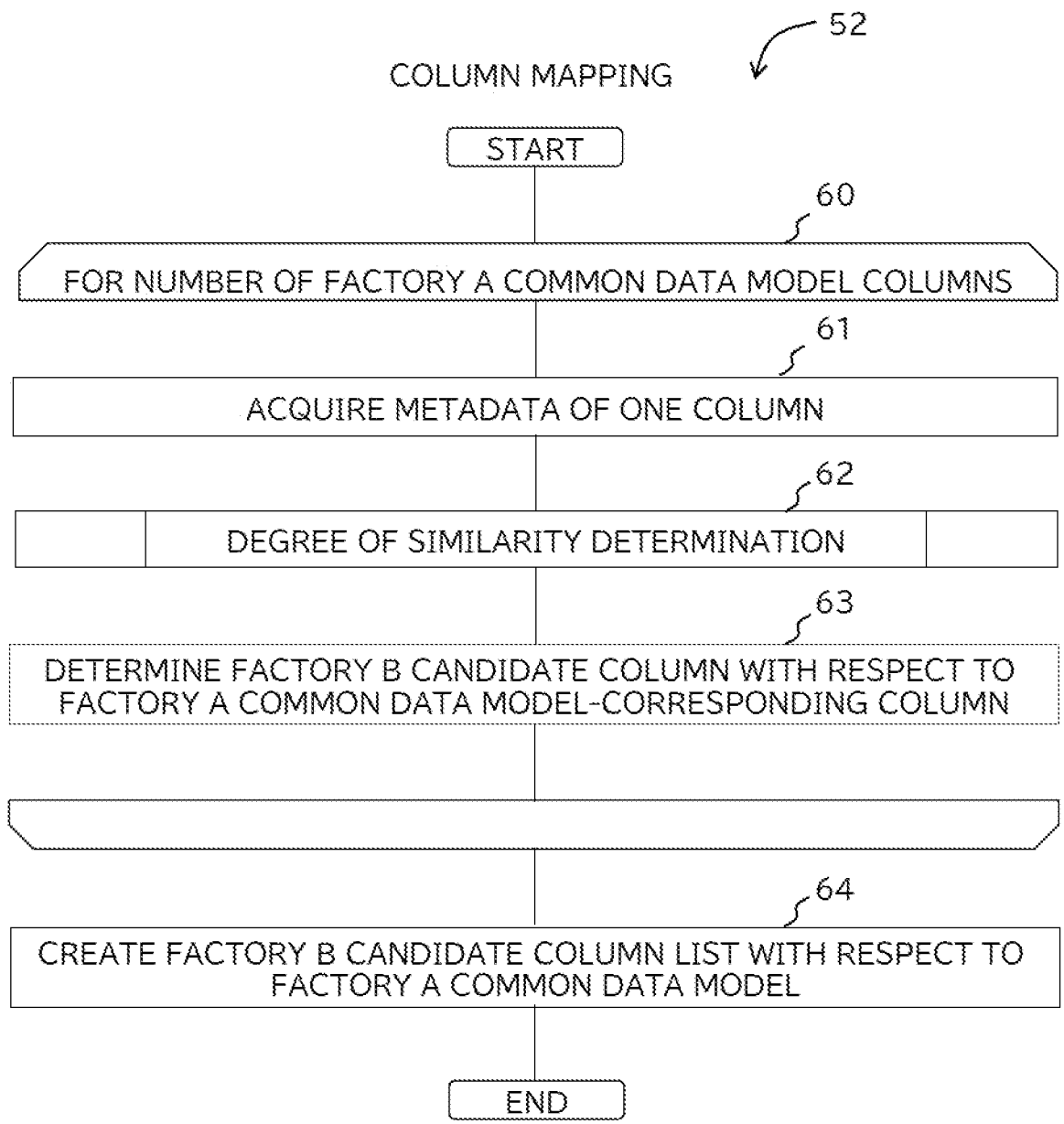

FIG. 8

FACTORY A COMMON DATA MODEL LIST    110

| TABLE | COLUMN 1 | COLUMN 2 | COLUMN 3 | COLUMN 4 | COLUMN 5 |
|---|---|---|---|---|---|
| PLAN | PLAN ID | PROCESS ID | PLANNED QUANTITY | . . . . | |
| OPERATION SPECIFICATION | OPERATION SPECIFICATION ID | PROCESS ID | ARTICLE ID | QUANTITY | |
| INSTALLATION CAPABILITY | INSTALLATION CAPABILITY ID | INSTALLATION ID | CAPABILITY ITEM | CAPABILITY | |
| NECESSARY RESOURCE | RESOURCE ID | ARTICLE NAME | FACTORY ID | RESOURCE TYPE | RESOURCE AMOUNT |

FIG. 9A

FACTORY A RETAINED DATA
COLUMN LIST
                                        120-1

121-1   122-1       123-1    124-1

| ID  | COLUMN     | TABLE           | ATTRIBUTE 1 |
|-----|------------|-----------------|-------------|
| 1   | PROCESS ID | LINE MANAGEMENT | ...         |
| 2   | SENSOR A   | LINE MANAGEMENT | ...         |
| 3   | PARAMETER  | LINE MANAGEMENT |             |
| ... | ...        |                 |             |

FIG. 9B

FACTORY B RETAINED DATA
COLUMN LIST                    ⌒120-2

121-2  122-2    123-2        124-2

| ID | COLUMN | TABLE | ATTRIBUTE 1 |
|----|--------|-------|-------------|
| 1 | PROCESS ID | PROCESS | ... |
| 2 | PLANNED QUANTITY | PLAN | ... |
| 3 | CAPABILITY | INSTALLATION SPECIFICATION | |
| ... | ... | | |

FIG. 10

COLUMN CANDIDATE LIST 170

| ID | UTILIZATION MODEL COLUMN | TABLE | PRESENCE OR ABSENCE OF CANDIDATE | EXTRACTION STEP | | | CANDIDATE 1 | | | CANDIDATE 2 | | |
|---|---|---|---|---|---|---|---|---|---|---|---|---|
| | | | | EXTRACTION | ETL ID | NECESSARY COLUMN ID | TABLE | COLUMN | ... | TABLE | COLUMN | ... |
| ... | ... | ... | ... | ... | ... | ... | ... | ... | ... | ... | ... | ... |
| 30 | RESOURCE ID | NECESSARY RESOURCE | PRESENT | COLUMN | ... | 1 | /INSTALLATION/asset_list.csv | INSTALLATION ID | ... | ... | ... | ... |
| ... | ... | ... | ... | ... | ... | ... | ... | ... | ... | ... | ... | ... |
| 35 | RESOURCE AMOUNT | NECESSARY RESOURCE | PRESENT | ETL | #10 | 1 10 | /PLAN/plan.csv | PROCESS ID | ... | /PLAN/plan.csv | PLANNED QUANTITY | ... |
| ... | ... | ... | ... | ... | ... | ... | ... | ... | ... | ... | ... | ... |
| 50 | xx RESULT | xx LOG | xx TRANSFORMATION | | | | | | | | | |
| ... | ... | ... | ... | ... | ... | ... | ... | ... | ... | ... | ... | ... |

171  172  173  174  175-1  175-2  175-3  176-1  176-2  175  176

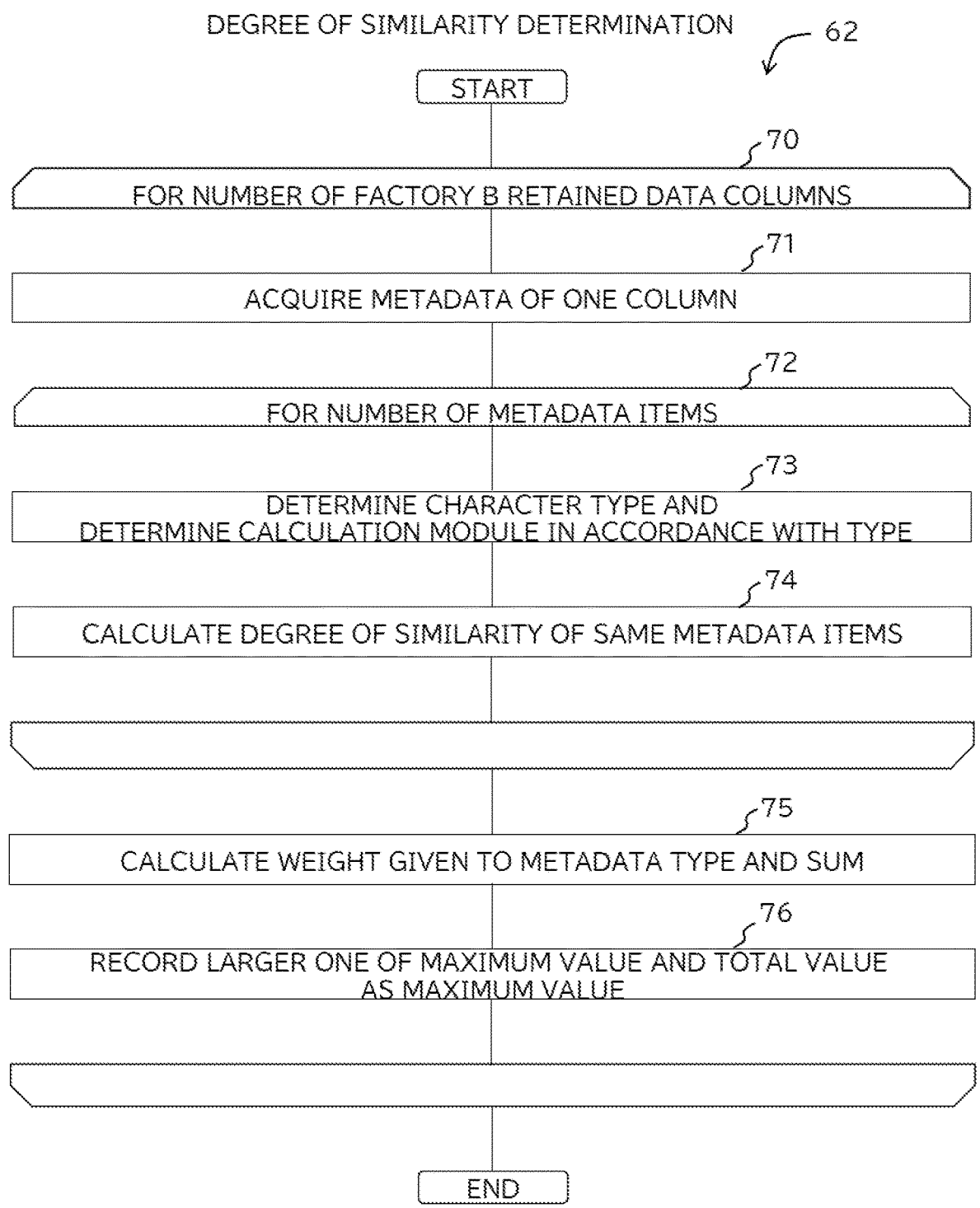

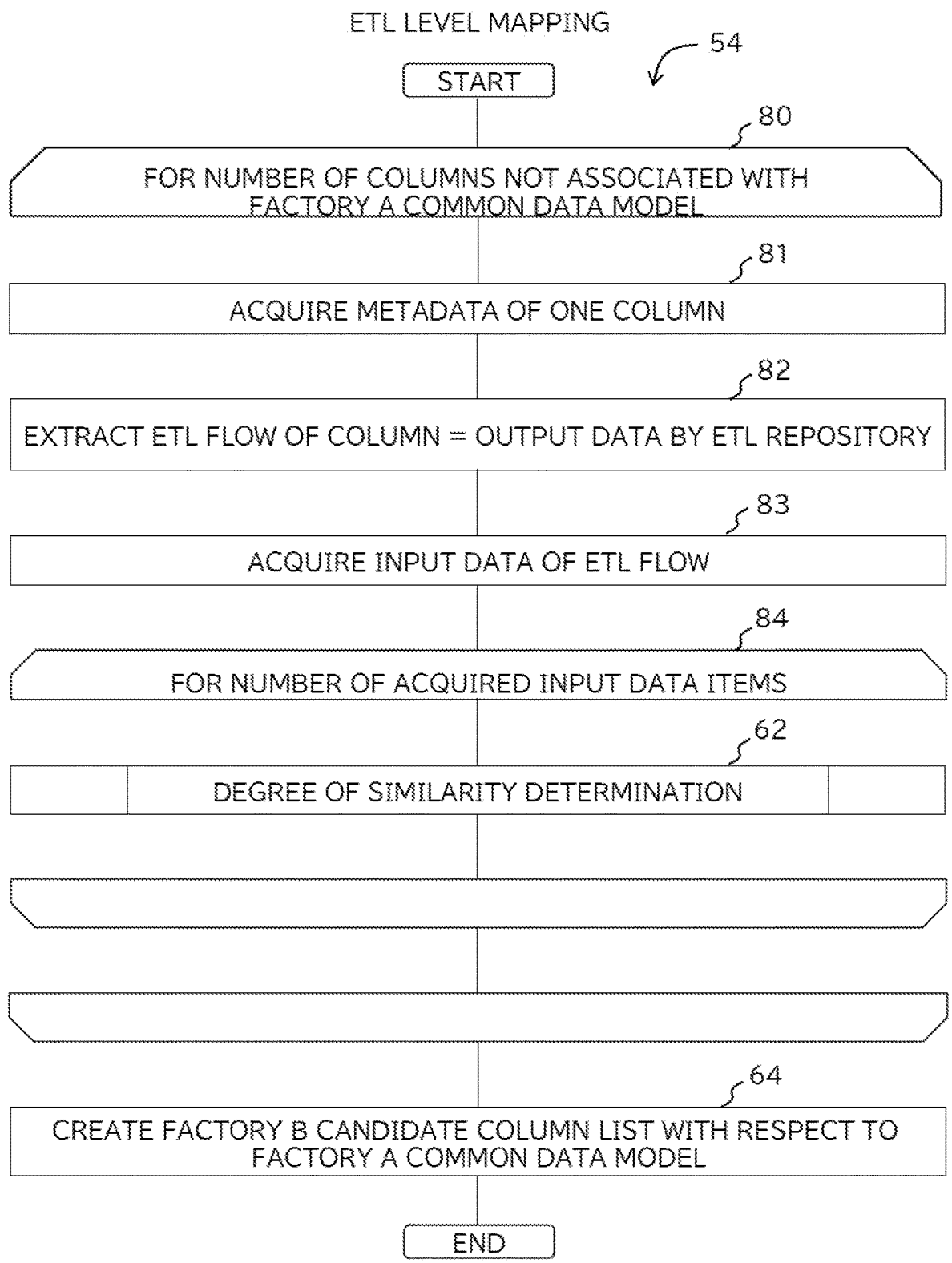

FIG. 13

ETL REPOSITORY 130

| ETL # | INPUT DATA | | | OUTPUT DATA | | |
|---|---|---|---|---|---|---|
| | COLUMN ID | COLUMN NAME | TABLE | COLUMN ID | COLUMN NAME | TABLE |
| 1 | D0002 | PROCESS ID | PLAN | D0003 | PLANNED QUANTITY | PLAN |
| | | | | Dxxx01 | INTERSTAGE 2 | topic 2 |
| 3 | D2004 | CAPABILITY | OPERATION SPECIFICATION | D3005 | INTERSTAGE 1 | topic 1 |
| | ... | ... | ... | | RESOURCE AMOUNT | NECESSARY RESOURCE |

PROCESSING 134

| PROCESSING ID | PROCESSING NAME |
|---|---|
| P0001 | PROCESSING 1 |
| P000N | PROCESSING N | hop 135

| from | to | from | to | from | to |
|---|---|---|---|---|---|
| D0002 | P0001 | D0003 | P0001 | - | - |
| Dxxx02 | P000N+1 | P000N+1 | D2004 | P0001 | Dxxx01 |
| | | P000N+1 | D3005 | D3005 | - |

FIG. 15

ETL EXECUTION LOG

| EXECUTION # | ETL | OWNER | EXECUTANT | EXECUTION START TIME | END TIME | ... |
|---|---|---|---|---|---|---|
| 0000 | ETL1 | USER A | USER A | 2020/11/01 10:00 | 2020/11/01 10:01 | |
| 0001 | ETL3 | USER A | USER A | 2020/11/01 10:10 | 2020/11/01 10:24 | |
| 0002 | ETL10 | USER B | USER C | 2020/11/01 10:20 | 2020/11/01 10:50 | |
| ... | | | | | | |

FIG. 16

DATA STORAGE ACCESS LOG  ↙ 38

| ACCESS# | CRUD | OWNER | EXECUTANT | ACCESS DESTINATION | EXECUTION START TIME | ... |
|---|---|---|---|---|---|---|
| 0010 | R | USER A | USER A | /dir1/INTERSTAGE DATA 1 | 2020/11/01 10:02 | |
| 0015 | R | USER A | USER A | /xx/SENSOR A.csv | 2020/11/01 10:02 | |
| 0028 | R | USER A | USER A | /xx/PARAMETER.csv | 2020/11/02 10:03 | |
| ... | | | | | | |
| 0101 | W | USER A | USER A | /dir2/INTERSTAGE DATA 2 | 2020/11/01 10:09 | |
| 0102 | D | USER B | USER C | /xx/xx/xx | 2020/11/01 10:08 | |
| ... | | | | | | |

ESTIMATED INPUT DATA

160

| ESTIMATION PROCESSING # | CONCATENATED INPUT DATA | ESTIMATED INPUT DATA | | | CONCATENATED OUTPUT |
|---|---|---|---|---|---|
| | | INPUT 1 | INPUT 2 | ... | |
| 0001 | /dir1/INTERSTAGE DATA 1 | /xx/SENSOR.csv | /xx/PARAMETER.csv | ... | /dir2/INTERSTAGE DATA 2 |
| 0002 | /xx/INTERSTAGE DATA N | /yy/TABLE 1 | /yy/TABLE 2 | ... | /zz/INTERSTAGE DATA M |
| ... | | | | | |

161, 162, 163-2, 163, 164, 163-1

DATA MANAGEMENT SYSTEM AND DATA MANAGEMENT METHOD

BACKGROUND OF THE INVENTION

1. Field of the Invention

The present invention relates to a data management system and a data management method relevant to a data lake.

2. Description of the Related Art

Data analysis or an AI utilization case has increased, and a need to use more data has increased. For example, in the industrial field, specific optimization has been attained for each department or each factory from the related art, and it is expected that the specific optimization is utilized for further business improvement by the collection of data from each part of a value chain, analysis, early development or communization of countermeasure means, and the like. Therefore, a data model that is reusable from developed analysis logic or applications is defined, and in a case where there is data corresponding thereto, the reuse is facilitated, and rapid introduction can be attained.

However, in order to grasp how much data corresponding to a reusable data model exists in data retained in the own factory, matching with the data model is required.

Here, for example, a data integration server of JP 2018-106400 A extracts a candidate of synonymous column data from attribute information such as a table name, a column name, and a format of data, and information of a data model, but in the matching of the attribute information of a data column in JP 2018-106400 A, for example, when the column name is changed by transformation processing of the column name, a case is expected in which the column name is not extracted as the candidate of the synonymous column data. On the other hand, a data processing flow management system of WO 2018-011895 A relates to a technology of search processing of a similar processing flow, and detects the similar processing flow from input data, output data, and processing logic of the processing flow, attribute information of data, and term synonymous relationship definition.

Then, since the acquired similar processing flow can be reused by calculating the degree of similarity of a data processing flow in addition to the determination of the degree of similarity of the data column, it is considered that a similar column that may not be extracted in the determination of the degree of similarity of the column can be extracted in the determination of the degree of similarity of the data processing flow by combining JP 2018-106400 A and WO 2018-011895 A.

However, the technology of WO 2018-011895 A is limited to the data processing flow that is registered and managed in a repository or the like. Here, in the actual environment, not all data or data processing flows are registered and managed. For example, it can be easily supposed that the data or the data processing flow shared in factories is determined as sharable data as a result of excluding private information, individual information, or the like or of being subjected to any performing. In addition, even in a case where an operator adjusts the data or the data processing flow for operation such as performing transformation processing each time with a shell or the like on site, the data or the data processing flow is not necessarily registered in the repository one by one. In data items to be generated through a plurality of data processing flows, in a case where a part of the data processing flows or the data items is not registered in the repository and is not shared, the data that is not shared is not included in a search target in the technology of WO 2018-011895 A.

SUMMARY OF THE INVENTION

Therefore, an object of the invention is to provide a data management system and a data management method in which a burden on a data manager or an application developer in processing of extracting determination information such as which retained data can be used or which data is to be collected can be reduced by possibly automating the detection of a candidate of retained data corresponding to a data model, in such an environment.

According to a first aspect of the invention, the following data management system is provided. The data management system is a system supporting the reuse of a data model by accumulating extract transform load (ETL) relevant to the existing data model in a repository. The data management system includes a processor. An estimated ETL level mapping processing unit is operated on the processor to estimate existence of unregistered ETL that is ETL not registered in the repository, to calculate a degree of similarity based on matching between the existing data model and retained data, and to extract a column to be a candidate based on the degree of similarity. The estimated ETL level mapping processing unit estimates the presence or absence of connectedness in the ETLs on the basis of correspondence between input data and output data in the ETLs by using an execution ETL log relevant to an execution history of the ETL to estimate the existence of the unregistered ETL.

According to a second aspect of the invention, the following data management method is provided. The data management method is a method using an electronic computer supporting reuse of a data model by accumulating ETL relevant to an existing data model in a repository. The data management method estimates existence of unregistered ETL that is ETL not registered in the repository, and calculates a degree of similarity based on matching between the existing data model and retained data. The data management method estimates the existence of the unregistered ETL that is the ETL not registered in the repository, calculates the degree of similarity based on the matching between the existing data model and the retained data, and extracts a column to be a candidate based on the degree of similarity. Here, the data management method estimates the presence or absence of connectedness in the ETLs on the basis of correspondence between input data and output data in the ETLs by using an execution ETL log relevant to an execution history of the ETL to estimate the existence of the unregistered ETL.

According to the invention, it is possible to reduce a burden on a data manager or an application developer in processing of extracting determination information such as which retained data can be used or which data is to be collected by possibly automating the detection of a candidate of retained data corresponding to a data model.

BRIEF DESCRIPTION OF THE DRAWINGS

FIG. 3 is a diagram for describing a configuration of a common data model-corresponding data grasp support processing unit;

FIG. 6 is a flowchart of processing relevant to acquisition of common data model-corresponding data of the common data model-corresponding data grasp support processing unit;

FIG. 7 is a flowchart of column mapping of a common data model-corresponding data processing unit;

FIG. 8 is a diagram illustrating an example of a common data model list table;

FIG. 9A is a diagram illustrating an example of a column list table of retained data of a factory A;

FIG. 9B is a diagram illustrating an example of a column list table of retained data of a factory B;

FIG. 10 is a diagram illustrating an example of a column candidate list;

FIG. 11 is a flowchart of processing of determining a degree of similarity;

FIG. 12 is a flowchart of ETL level mapping of the common data model-corresponding data processing unit;

FIG. 13 is a diagram illustrating an example of an ETL repository table;

FIG. 15 is a diagram illustrating an example of an ETL execution log table;

FIG. 16 is a diagram illustrating an example of a data storage access table;

FIG. 17 is a diagram illustrating an example of an estimated input data table of estimated ETL;

DETAILED DESCRIPTION OF THE PREFERRED EMBODIMENTS

Figure 1:
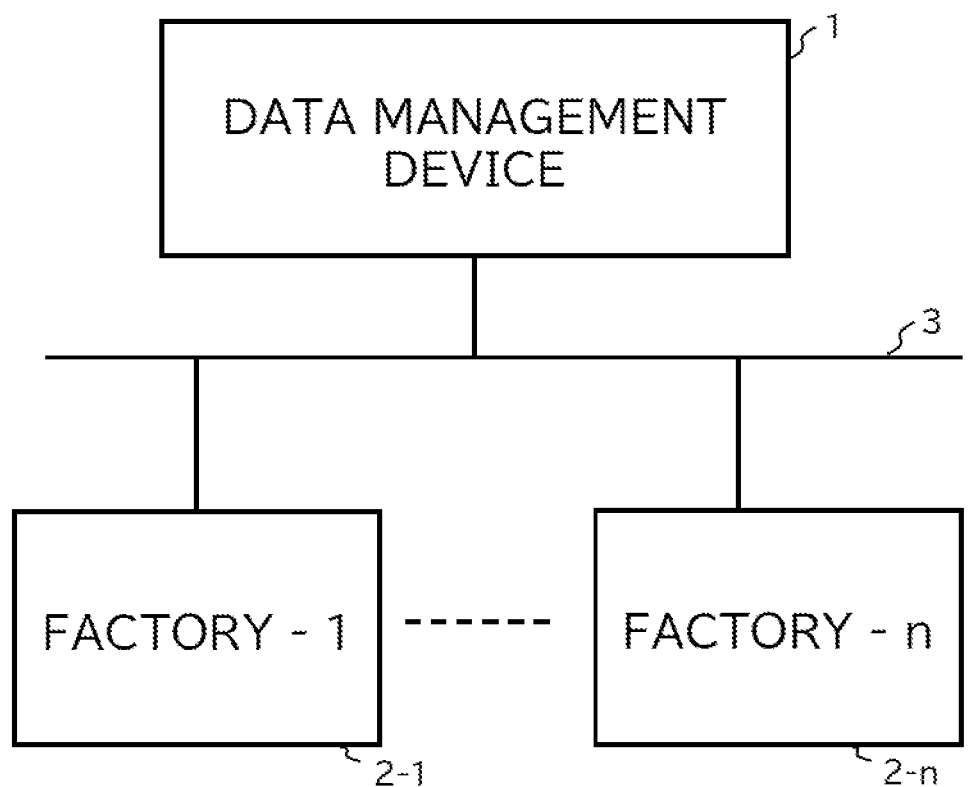
FIG. 1 is a diagram for describing a configuration of a data utilization support system with an industrial field as a use case.

Hereinafter, a mode for implementing the invention (referred to as "this embodiment") will be described with suitable reference to the drawing. This embodiment is an example of grasping the degree of similarity of retained data of a factory B with respect to data of a common data model (the existing data model) generated for business improvement application in a use case of introducing the business improvement application of a factory A to the factory B. Note that, this embodiment is assumed to be implemented on manufacturing site, but is merely an example, and is not necessarily implemented on manufacturing site.

FIG. 1 is an example of the overall configuration of a data utilization support system (data management system). A data management device 1 is connected to one or more factories (2-n) through a network 3. The data management device 1 collects one or more common data models to be generated in the factories (2-n) to be stored and managed in an ETL repository, and responds to a common data model candidate column extraction request from a user.

Figure 2:
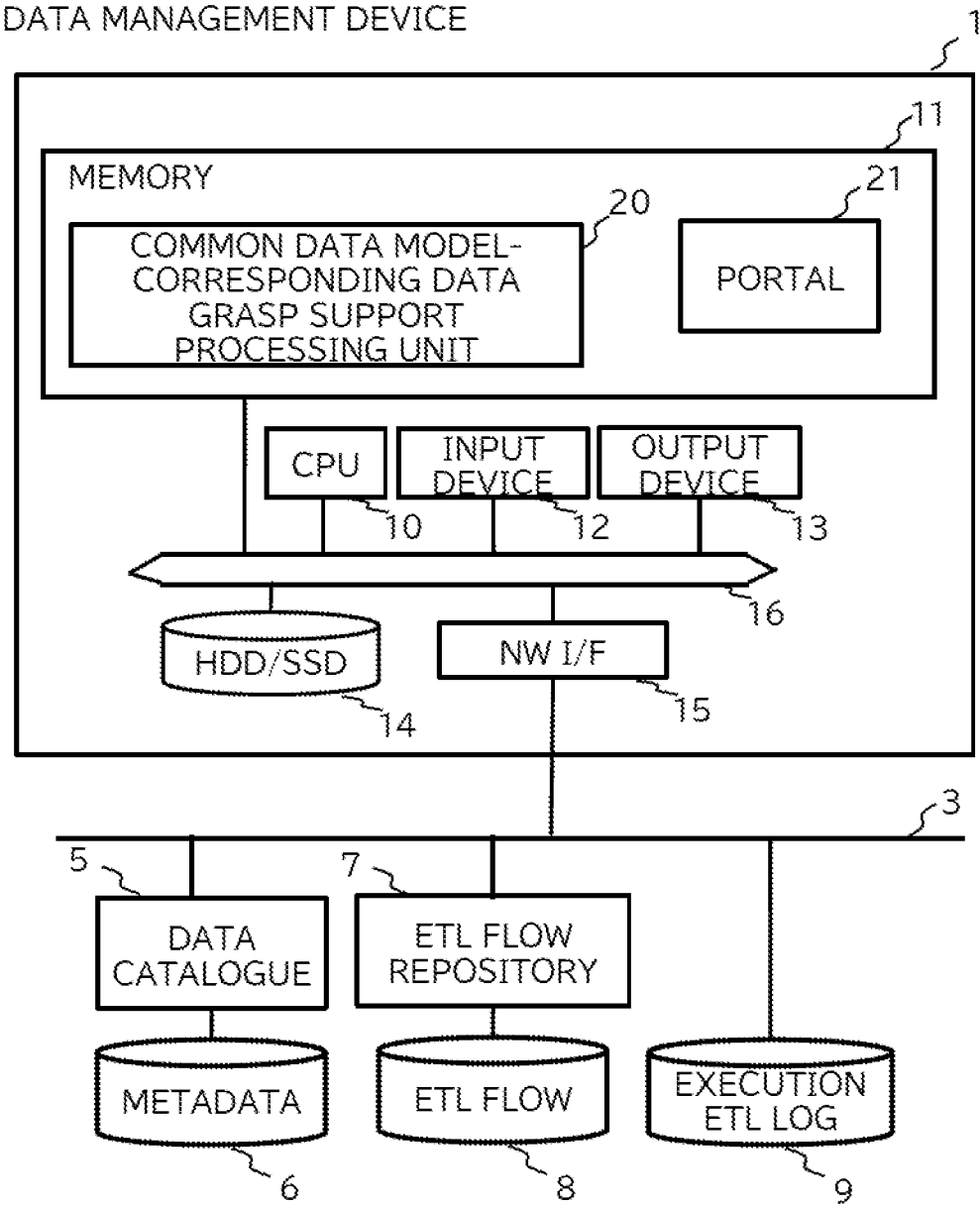
FIG. 2 is a diagram for describing a system configuration of a data management device.

FIG. 2 is an example of the configuration of the data management device 1. The data management device 1 can be a general computer, and the data management device 1 includes a central control unit 10, a main storage device 11, an input device 12 such as a camera, a mouse, or a keyboard, an output device 13 such as a speaker or a display, an auxiliary storage device 14, and a communication interface 15. Note that, in the example of FIG. 2, the central control unit 10 is represented as a CPU 10, the main storage device 11 is represented as a memory 11, the auxiliary storage device 14 is represented as a HDD/SSD 14, and the communication interface 15 is represented as a NWI/F 15. Then, such units are connected to each other through a bus 16.

A common data model-corresponding data grasp support processing unit 20 and a portal 21 are a program, and are executed by being decompressed in the main storage device 11. The data management device 1 is connected to a data catalogue server 5, a metadata storage 6, an ETL flow repository server (ETL repository), an ETL flow storage 8, and an execution ETL log 9 through the network 3. Here, the metadata storage 6 stores metadata managed in the data catalogue server 5. The ETL flow storage 8 stores one or more ETL flows collected from the factories (2-n). The execution ETL log 9 stores execution logs of the ETL flows executed in the factories (2-n).

FIG. 3 illustrates an example of the configuration of the common data model-corresponding data grasp support processing unit 20. The common data model-corresponding data grasp support processing unit 20 includes a common data model management unit 21, a common data model storage unit 22, a common data model ETL flow storage unit 23, a verification target data management unit 24, a metadata storage unit 25 of verification target data, a metadata storage unit 26 of the common data model, a column mapping processing unit 27, an ETL level mapping processing unit 28, an estimated ETL level mapping processing unit 29, a character type determination unit 30, a degree of similarity calculation module management unit 31, and a common data model-corresponding candidate data presentation unit 32.

The common data model management unit 21 is used for managing the common data model. The common data model storage unit 22 is used for storing the common data model. The common data model ETL flow storage unit 23 is used for storing the ETL flow of the common data model. In addition, the character type determination unit 30 is used for executing a plurality of character type transformation units described below. The degree of similarity calculation module management unit 31 is used for managing a degree of similarity calculation unit (calculation module) that calculates the degree of similarity. The common data model-corresponding candidate data presentation unit 32 is used for presenting candidate data to the user.

In this embodiment, the verification target data management unit 24 is used for managing the retained data of the factory B. The metadata storage unit 25 stores metadata of the retained data of the factory B. The metadata storage unit 26 stores metadata of retained data of the factory A that is a factory generating the common data model.

Figure 4:
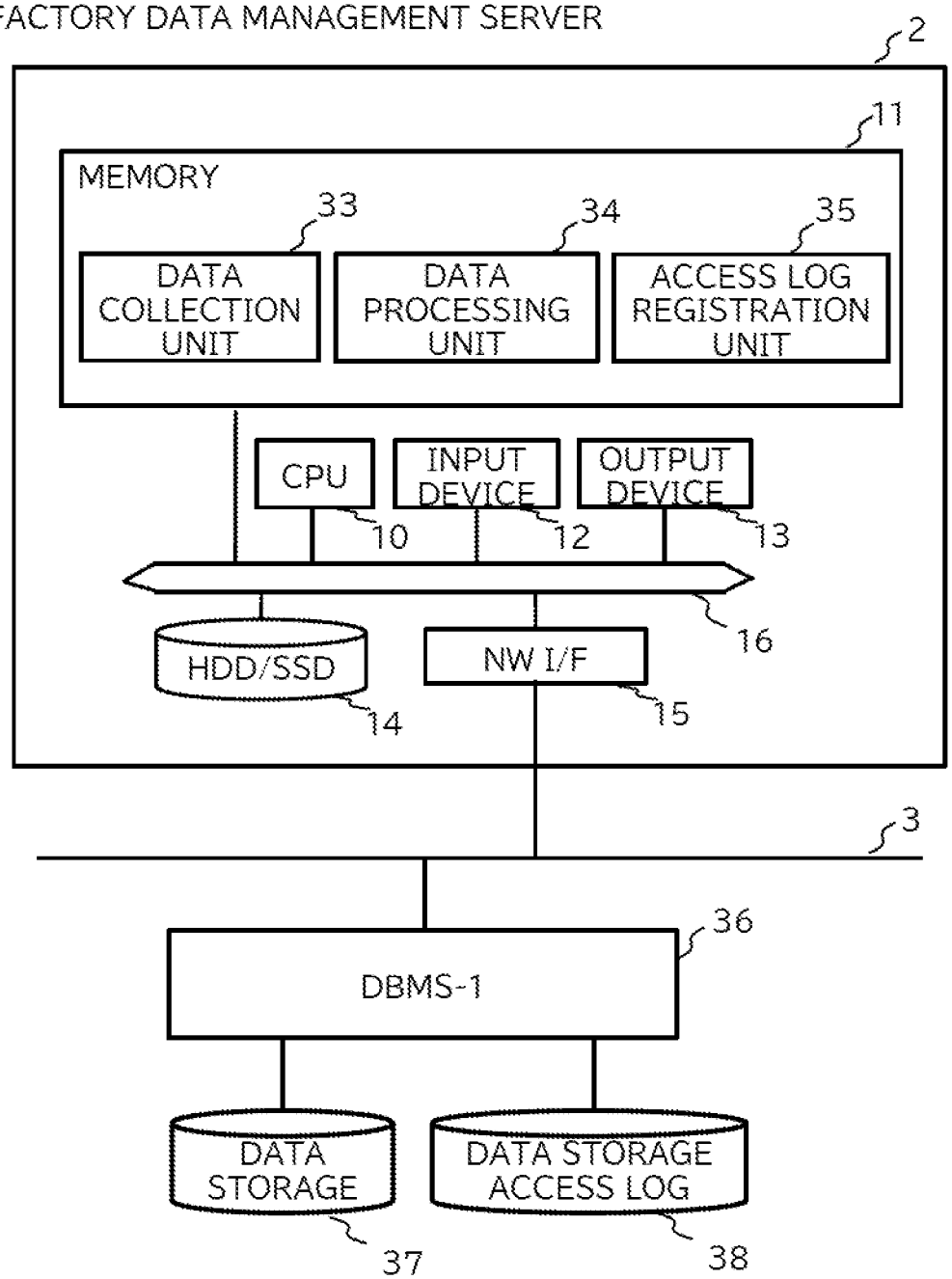
FIG. 4 is a diagram for describing a configuration of a factory data management server.

FIG. 4 illustrates an example of the configuration of the factory data management server 2. The factory data management server 2 can be a general computer, and the factory data management server 2 includes the central control unit 10, the main storage device 11, the input device 12 such as a camera, a mouse, or a keyboard, the output device 13 such as a speaker or a display, the auxiliary storage device 14, and the communication interface 15. In the example of FIG. 4, the central control unit 10 is represented as the CPU 10, the main storage device 11 is represented as the memory 11, the auxiliary storage device 14 is represented as the HDD/SSD 14, and the communication interface 15 is represented as the NWI/F 15. Then, such units are connected to each other through the bus 16.

The factory data management server 2 includes a data collection unit 33, a data processing unit 34, and an access log registration unit 35. The data collection unit 33 is used for collecting various data items to be generated in the factory. The data processing unit 34 is used for processing the collected data. A DBMS 36 (in FIG. 4, represented as DBMS-1) is used for managing a database. The data storage 37 stores data generated in the factory. The access log registration unit 35 is a program, and is executed by being decompressed in the main storage device 11. The access log registration unit 35 is used for registering an access log to the data of the data storage 37 storing the data generated in the factory in a data storage access log 38.

Figure 5:
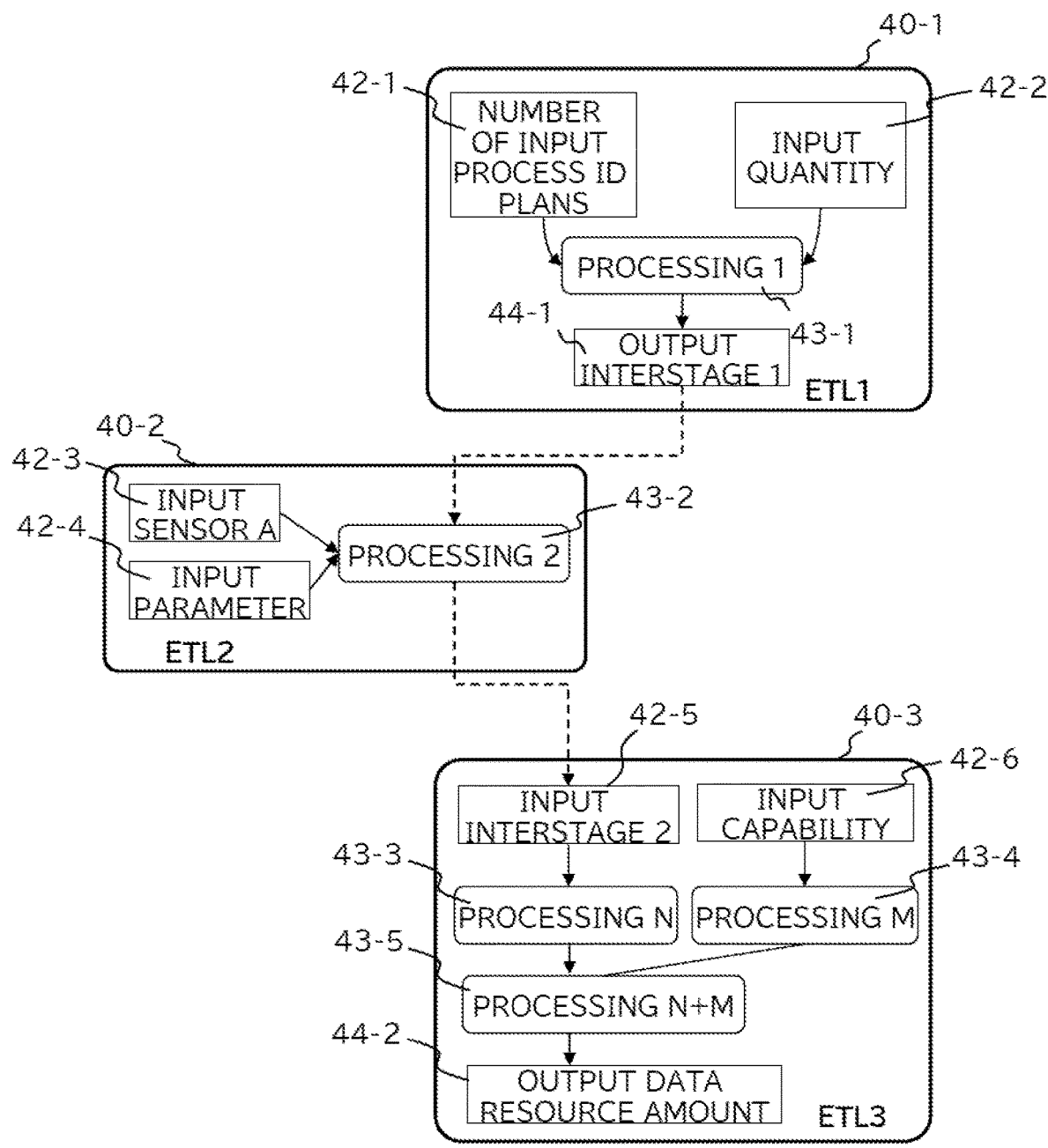
FIG. 5 is a diagram for describing data relevant to an ETL flow.

FIG. 5 illustrates an example of one or more ETL flows (ETLs) that generate one column of the common data model, one or more input data items or one or more output data items to the ETL flow, and connection in the ETL flows, in this embodiment. In this example, examples of a column of the common data model include a "resource amount", and the "resource amount" is generated from ETL flow groups (40-1, 40-2, and 40-3).

By tracing back to the ETL flow groups 40-*n*, a relationship in all input data items 42-*n*, all processing items 43-*n*, and all output data items 44-*n* according to the "resource amount" is acquired (grasped). That is, in this example, the ETL flow (40-1) processes the "number of process ID plans" (42-1) and "quantity" (42-2) that are the input data in processing 1 (43-1), and outputs an "interstage 1" (44-1) that is the output data. Then, in the ETL flow (40-2), the "interstage 1" (44-1) is input, a "sensor A" and a "parameter" that are the input data are input, and the processing is executed in processing 2 (43-2). Then, in the ETL flow (40-3), an "interstage 2" (42-5) is processed in processing N (43-3), and in parallel therewith, "capability" (42-6) that is the input data is processed in processing M (43-4), and such processing result data items are processed in processing N+M (43-5), and thus, a "resource amount" (44-2) is generated.

Next, the processing of the common data model-corresponding data grasp support processing unit 20 will be described with reference to FIG. 6. FIG. 6 illustrates a processing flow of the common data model-corresponding data grasp support processing unit 20. Here, for example, a case in which the user of the factory B designates the common data model of the factory A will be described. Note that, a subject of the processing flow is the central control unit 10 of the data management device 1.

In a case where the user of the factory B designates the common data model of the factory A, in step 50, the common data model management unit 21 is executed, and a column list of the common data models of the factory A is acquired. In addition, in step 51, the verification target data management unit 24 is executed, and a column list of data items retained in the factory B is acquired. Note that, an execution order of step 50 and step 51 is not limited.

Next, in step 52, the matching of all of the acquired columns is performed, and column mapping is performed. Note that, processing relevant to the column mapping is processing based on the column mapping processing unit 27, and will be described below in detail.

As a result of the column mapping, in a case where a column without any corresponding candidate exists between the retained data of the factory B and the common data model of the factory A (step 53-*y*), in step 54, ETL level mapping is performed. Note that, the ETL level mapping processing is processing based on the ETL level mapping processing unit 28, and will be described below in detail.

As a result of the ETL level mapping, in a case where there is no corresponding candidate between the retained data of the factory B and the common data model of the factory A (step 55-*y*), in step 56, estimated ETL level mapping is performed. Processing relevant to the estimated ETL level mapping is processing based on the estimated ETL level mapping processing unit 29, and will be described below in detail.

On the other hand, in a case where there is the corresponding candidate between the retained data of the factory B and the common data model of the factory A (step 53-*n*, step 55-*n*), information of a column of the retained data is added to a candidate column list described below in detain. In addition, the information of the column of the retained data is suitably added to the candidate column list, in accordance with a result of the estimated ETL level mapping processing.

Then, in step 57, the common data model-corresponding candidate data presentation unit 32 is executed, and thus, the candidate column list is presented to the user.

Next, the processing based on the column mapping processing unit 27 (the column mapping) will be described in detail with reference to FIG. 7. FIG. 7 is a processing flow of the column mapping of step 52. Note that, a subject of the processing flow is the central control unit 10 of the data management device 1. Before the detailed description of the column mapping processing, first, an example of the column data to be a target of the column mapping processing will be described with reference to FIG. 8, FIG. 9A, and FIG. 9B. FIG. 8, FIG. 9A, and FIG. 9B illustrate an example of the column data.

FIG. 8 is an example of the column list of the common data models (a common data model list 110) of the factory A. Here, the common data model list 110 that is the column list includes a table name 111, and column names (112-*n*) belonging to a table indicated by the table name 111. Further, attribute information with respect to each of the columns (112-*n*) may be added to the common data model list 110. Here, as an example, information such as a logic column name, a data format, an outline, and high-level conceptual terms of the corresponding field is included in the attribute information.

FIG. 9A is an example of the column list of the retained data items (a retained data column list 120-1) of the factory A, and FIG. 9B is an example of the column list of the retained data items (a retained data column list 120-2) of the factory B. The column lists (120-1/2) of the retained data items include column IDs (121-1/2), column names (122-1/2), table names (123-1/2), other attribute information items (124-1/2), and the like, respectively. As with a case of the common data model list 110, attribute information such as a logic column name, a data format, an outline, and high-level conceptual terms of the corresponding field may be added.

The column mapping processing will be described in detail. As illustrated in FIG. 7, in a case where the column mapping processing (the processing corresponding to step 52 described above) starts, in step 60, the processing of steps 61 to 63 is repeatedly executed for the number of columns of the common data models of the factory A acquired in step 50.

In step 61, one column of the common data model including the metadata is acquired from the common data model list 110 of the factory A. Then, in step 62, degree of similarity determination processing of the retained data of the factory B with respect to the acquired column of the common data model is performed. Note that, the degree of similarity determination processing will be described below in detail. Then, in step 63, a candidate column of the retained data of the factory B with respect to the column of the common data model of the factory A is determined on the basis of a result of the degree of similarity determination.

Then, after the processing for the number of columns of the common data models of the factory A ends, in step 64, the candidate column list of the factory B with respect to the common data model of the factory A is created. Note that, at this time point, the column to be the candidate may not exist.

Here, the candidate column list will be described with reference to FIG. 10. FIG. 10 illustrates an example of the candidate column list. A candidate column list 170 (in FIG. 10, represented as a column candidate list) includes IDs 171 of all columns of the common data models, a column name 172 of the common data model, table information 173 that is information of the table to which the column belongs (the table name, a storage place, and the like), presence or absence 174 of the candidate that is information of the presence or absence of the candidate column with respect to the column, an extraction step 175 of the candidate column, and information of one or more candidate columns 176 (in FIG. 10, represented as a candidate). Here, the extraction step 175 indicates in which mapping the candidate column is extracted, and includes information about an extraction level 175-1 (a column level, an ETL level, and an estimated ETL level). Then, in a case where the extraction level 175-1 is the ETL level or the estimated ETL level, an identification number 175-2 of the extracted ETL and one or more input column data IDs to the extracted ETL (in FIG. 10, represented as a necessary column ID 175-3) are further included. In addition, the information of the candidate column 176 includes at least table information 176-1 belonging to the candidate column, and a candidate column name 176-2.

Next, the flow of the degree of similarity determination processing corresponding to step 62 will be described with reference to FIG. 11. FIG. 11 illustrates the flowchart of the degree of similarity determination processing. In the flow of the degree of similarity determination processing, the character type determination unit 30 or the degree of similarity calculation module management unit 31 is used, and a subject of the degree of similarity determination processing is the central control unit 10 of the data management device 1.

In the degree of similarity determination processing, in step 70, the processing of steps 71 to 76 is performed for the number of columns of the retained data items of the factory B acquired in step 51.

In step 71, the verification target data management unit is executed, and one column of the retained data of the factory B including the metadata is acquired. Then, in step 72, step 73 and step 74 are performed with respect to each of the attribute information items associated with the data of the column. Here, the attribute information is the metadata, and for example, is the column name, the logic column name, the data format, the outline information, the high-level conceptual terms, and the like, and the processing of step 73 and step 74 is performed for the number of information items.

In step 73, a character type of the acquired metadata is determined, and the degree of similarity calculation unit according to the character type is determined. For example, in Japan, Roman character notation of the Japanese language, and a plurality of character types may be used in addition to the Japanese language (Hiragana letters, Katakana letters, and Chinese characters) and the English language. In addition, the same degree of similarity calculation unit is not necessarily effective between the English language and the Japanese language. Further, in a case where notation types are different, for example, in a case where the column of the common data model is in the English language notation and the column of the retained data is in the Roman character notation of the Japanese language, it can be easily supposed that a degree of similarity calculation result is a low score in such a state. Accordingly, since it is necessary to perform transformation processing for aligning the character types and to apply the degree of similarity calculation unit suitable for the aligned character types, in step 73, the character type is determined and the transformation processing for aligning the character types is performed by using the plurality of character type transformation unit, and then, a suitable degree of similarity calculation unit (the calculation module) is determined.

In step 74, for metadata items that are transformed to the same character type by using a plurality of character type transformation units 30, the degree of similarity is calculated by using the determined degree of similarity calculation unit 31. Here, as a method for calculating the degree of similarity, various known technologies are utilized.

Then, in step 75, the total value of the degrees of similarity of the columns is calculated by multiplying the calculated value of the degree of similarity for each metadata item that is calculated in step 74 and a weight coefficient that is given in advance to each of the metadata items together to sum up the degrees of similarity. Here, the weight coefficient can be suitably set. For example, in Japan, there is a case where the character type is different for the column name, but it is expected that a logic name is generally in Japanese language notation, and thus, it can be designed such that the degree of contribution to the degree of similarity determination can be increased and suitable determination can be performed, by setting the weight coefficient of the column name to be greater than the weight coefficient of the logic name.

Then, in step 76, on the basis of the total value of the degrees of similarity of the columns of the retained data items of the factory B, and a column greater than or equal to a threshold value set in advance is recorded as the candidate in the candidate column list 170. Here, among the maximum value of the degree of similarity of the metadata and the total value of the degrees of similarity, the larger value which is greater than or equal to the threshold value may be recorded as the maximum value in the candidate column list 170.

Next, processing based on the ETL level mapping processing unit 28 (the ETL level mapping) will be described in detail with reference to FIG. 12. FIG. 12 illustrates a flowchart of the ETL level mapping of step 54. Note that, a subject of the processing flow is the central control unit 10 of the data management device 1.

In step 80, the processing of steps 81 to 84 is performed for the number of columns in which the candidate column is not capable of being extracted in the column mapping of the step 52, among the columns of the common data models of the factory A.

First, in step 81, the common data model management unit 21 is executed, and one column of the common data model of the factory A including the metadata is acquired. Then, in step 82, an ETL flow in a relationship of Column=Output Data is acquired from the ETL repository 7. That is, when describing with reference to the example of FIG. 5, an ETL flow for outputting the "resource amount"

(44-2) that is the final output data is ETL 3 (40-3), and thus, in the example of FIG. 5, the ETL 3 (40-3) is acquired.

Note that, as illustrated in FIG. 13, as an example, data of the ETL flow is registered in a table format in the ETL repository 7, and as an example, an ETL repository table 130 includes information 131 for identifying each ETL, input data 132, output data 133, information of processing (in FIG. 13, represented as processing 134), and information of hop (in FIG. 13, represented as hop 135). The input data 131 and the output data 132 include information such as column IDs (132-1/133-1), column names (132-2/133-2), and table names (132-3/133-3) according to each of the ETL flows. The information of the processing includes information such as a processing ID (134-1) and a processing name (134-2) according to each of the ETL flows. The information of hop includes information such as a transmission source (135-1) and a transmission destination (135-2) according to each of the ETL flows.

Then, in step 83, the input data of the ETL flow acquired in step 82 is acquired. For example, in a case where the ETL 3 (40-3) is acquired in step 82, "interstage 2" (42-5) and "capability" (42-6) that are the input data to ETL 3 (40-3) are acquired.

Then, in step 84, the degree of similarity determination of step 62 is performed for the number of input data items acquired in step 83. That is, the degree of similarity determination in the ETL level mapping is performed by using the metadata between the input data of the ETL that is acquired from the ETL repository 7 and the column of the retained data of the factory B. Then, in step 64, the candidate column list of the factory B with respect to the common data model of the factory A is created. Note that, at this time point, the column to be the candidate may not exist.

Figure 14:
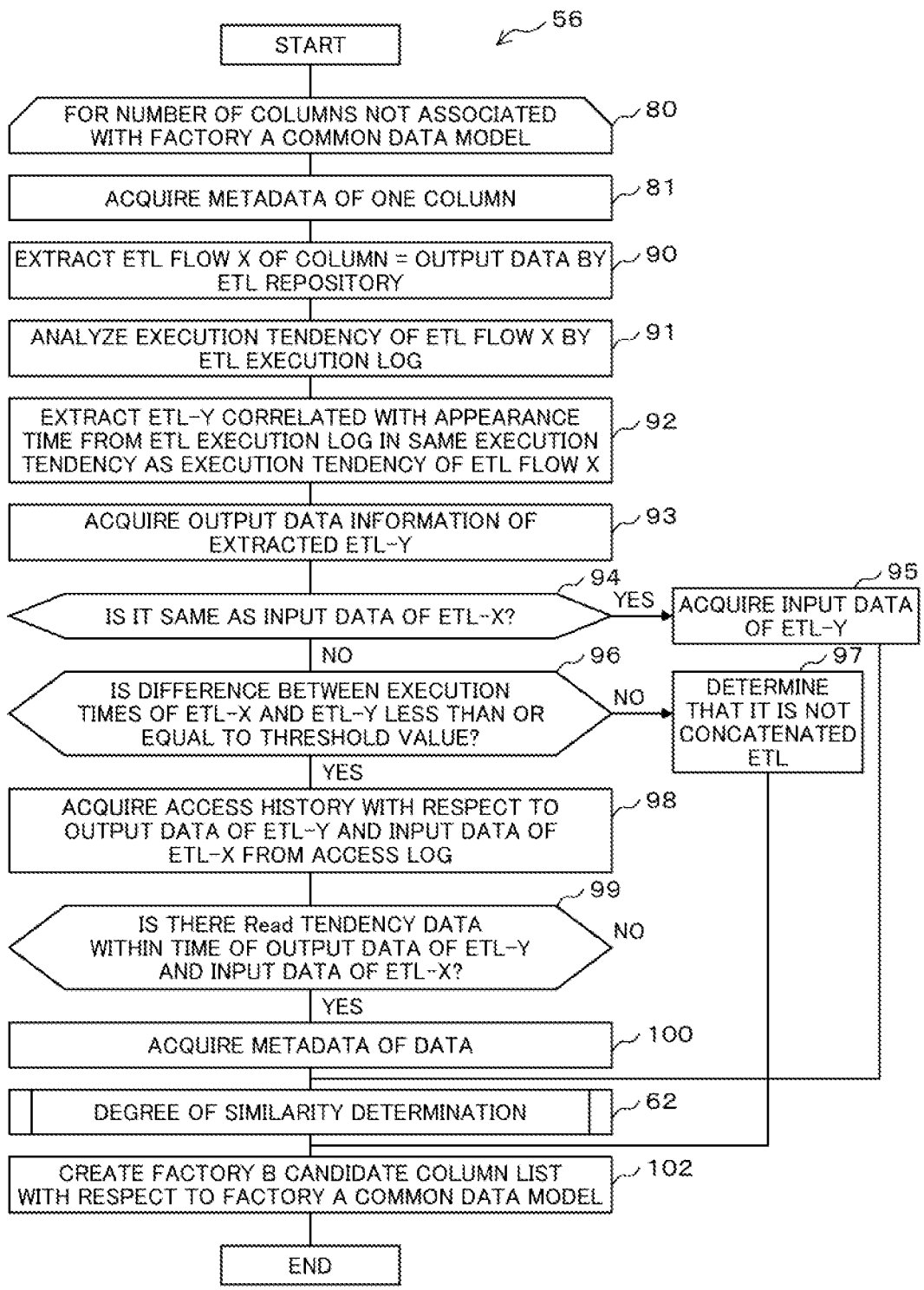
FIG. 14 is a flowchart of estimated ETL level mapping of the common data model-corresponding data processing unit.

Next, processing of further searching for the ETL flow with respect to the columns in which the candidate column is not capable of being extracted in the column mapping 52 and the ETL level mapping 54 (the estimated ETL level mapping 56) will be described with reference to FIG. 14. FIG. 14 illustrates a flowchart of the estimated ETL level mapping. Note that, the estimated ETL level mapping 56 is processing based on the estimated ETL level mapping processing unit 29, and a subject of the processing is the central control unit 10 of the data management device 1.

In step 80, the processing of steps 81, and 90 to 101 is performed for the number of columns in which the candidate column is not capable of being extracted in the ETL level mapping, among the columns of the common data models of the factory A.

First, in step 81, the common data model management unit 21 is executed, and one column of the common data model of the factory A including the metadata is acquired. Then, in step 90, the ETL flow in the relationship of Column=Output Data is acquired from the ETL repository 7. As described above, in the example of FIG. 5, the ETL flow for outputting the "resource amount" (44-2) that is the final output data is ETL 3 (40-3), and thus, in this example, the ETL 3 (40-3) is acquired.

Then, in step 91, one or more execution logs of the ETL 3 (40-3) is acquired from the execution ETL log 9, and an execution tendency of the ETL 3 (40-3) is analyzed from information of the execution ETL log 9. Here, an example of the execution ETL log 9 is illustrated in FIG. 15.

As illustrated in an example of FIG. 15, the execution ETL log 9 (in FIG. 15, represented as an ETL execution log 140) includes an ETL execution ID 141, an execution ETL flow ID 142, owner information 143 of the ETL flow, executant information 144 of the ETL flow, an execution start time 145 and an execution end time 146 of the ETL flow, and the like. Note that, the executant information 144 may be a user (person) or a program.

Note that, in execution tendency analysis of step 91, a known technology can be used. For example, in the execution ETL log 9, the execution tendency of the ETL flow may be analyzed by focusing on periodical or punctual execution by an owner or an executant of a certain ETL flow.

Then, in step 92, there is the same execution tendency as the execution tendency of the ETL flow analyzed in step 91, and the ETL flow correlated with an appearance time is extracted from the execution ETL log 9. For example, there is a tendency that ETL flow 1 (40-1) is periodically executed before the execution start time 145 of the ETL flow 3 (40-3), and in a case where the execution of the ETL flow 3 (40-3) is correlated with the execution of the ETL flow 1 (40-1) (as an example, a case in which the ETL flow 1 is frequently executed by the same executants before a predetermined time from the execution start time of the ETL flow 3, and it is checked that the ETL flows are correlated with each other), the ETL flow 1 (40-1) is extracted. Then, in step 93, the "interstage 1" that is the output data of the extracted ETL flow 1 (40-1) is acquired.

Further, in step 94, whether or not the output data of the ETL to be executed before and the input data of the ETL to be executed later are the same is verified on the basis of the execution order of the ETL. For example, by comparing the "interstage 1" that is the output data of the ETL 1 (40-1) with the "interstage 2" or the "capability" that is the input data of the ETL 3 (40-3), in a case where the same data is included and connectedness in the ETLs is checked (that is, in a case where there are the corresponding output data and the corresponding input data, and the connectedness in the ETLs is checked) (step 94-y), in step 95, the "number of process ID plans" and the "quantity" that are the input data of the ETL 1 (40-1) are acquired. Then, the degree of similarity determination based on the metadata of step 62 is performed.

On the other hand, in a case where the output data of the ETL 1 (40-1) is different from the input data of the ETL 3 (40-3) (step 94-n), in step 96, a difference between the execution time of the ETL 1 (40-1) and the execution time of the ETL 3 (40-3) is calculated, and whether or not the difference between the execution times is within a threshold value set in advance is verified.

Here, in a case where the difference is greater than or equal to the threshold value (for example, in a case where there is a tendency that the ETL 3 (40-3) is executed in one month after the execution of the ETL 1 (40-1), and thus, the difference is greater than or equal to the threshold value) (step 96-n), step 97 is performed. In step 97, it is determined that the ETL 1 (40-1) and the ETL 3 (40-3) are not the ETLs that are processed by being concatenated, and in step 102, a result of estimating that there is no column corresponding to an "output amount (in this description, a resource amount 44-2)" and there is no column that is necessary for generating the "output amount", in the retained data of the factory A, is updated in the candidate column list 170.

On the other hand, in a case where the difference between the execution time of the ETL 1 (40-1) and the execution time of the ETL 3 (40-3) is within the threshold value (step 96-y), it is estimated that there is ETL not registered in the ETL repository 7 (unregistered ETL), and the unregistered ETL is obtained. First, in step 98, an access history with respect to the output data of the ETL 1 (40-1) and the input data of the ETL 3 (40-3) is acquired from the access log 38. Here, an example of the access log 38 is illustrated in FIG. 16.

As illustrated in an example of FIG. 16, the access log 38 includes an access ID 151, an access manipulation type 152, an accessed data owner 153, an access manipulation executant 154, access destination information (data storage place) 155, an execution start time 156 of access processing, and the like. Here, the access manipulation type 152 (in FIG. 16, CRUD) indicates the type of manipulation such as Read/Write/Update/Delete.

Then, in step 99, whether or not there is data that tends to be subjected to Read processing is searched between a record time of the ETL 1 (40-1) and a record time of the ETL 3 (40-3) by using the access history acquired in step 98.

In the example of FIG. 16, a Read manipulation with respect to the "interstage 1" that is the output data of the ETL 1 (40-1) is recorded with an access ID "0010", and a Write manipulation of the "interstage 2" that is the input data of the ETL 3 (40-3) is recorded with an access ID "0101". Accordingly, in step 98, such two access histories are acquired. Then, in step 99, it is estimated that some ETL flows may be executed between such two access processing items, and in this period, data in which the access processing is record is extracted. That is, the data of the "sensor A" based on an access ID "0015" and the data of the "parameter" based on an access ID "0028" are extracted. Then, in step 100, in a case where metadata of the extracted data (in this case, metadata of two data items of the "sensor A" and the "parameter") is acquired, and a result thereof is recorded in an estimated input data table.

Note that, it may be estimated that the extracted data is the input data to the unregistered ETL on the basis of an extraction frequency of the data. For example, in a case where the level of the extraction frequency of the "sensor A" and the "parameter" according to a plurality of access IDs is greater than or equal to a predetermined threshold value, it may be estimated that the "sensor A" and the "parameter" are the input data to the unregistered ETL, and a result thereof may be recorded in the estimated input data table.

As illustrated in an example of FIG. 17, an estimated input data table 160 includes an estimated processing ID 161, concatenated input data 162, one or more estimated input data items 163-n, and concatenated output data 164. Then, in a case where data is recorded in the estimated input data table 160, the degree of similarity determination based on the metadata of step 62 is performed by using the estimated input data table 160. That is, the degree of similarity determination is performed by using the metadata between the input data of the ETL that is estimated not to be registered in the ETL repository 7 and the column of the retained data of the factory B. As a result of the degree of similarity determination, in a case where it is determined that there is the candidate column, in step 102, the extraction level 175-1 of the extraction step 175 is updated to the estimated ETL in the candidate column list of the factory B.

Note that, the estimated ETL level mapping 56 is different from the column mapping 52 and the ETL level mapping 54, the ETL is extracted and the degree of similarity is calculated by using estimation processing. Accordingly, separately from the processing of step 75 in the degree of similarity determination processing described above, a design of decreasing the degree of contribution to the degree of similarity determination by multiplying the calculated degree of similarity and the weight coefficient together may be performed by executing a suitable program. Here, the weighting may be suitably performed such that the degree of contribution to the degree of similarity determination of the estimated ETL level mapping 56 decreases, and as an example, the weighting may be performed in priority order of Column Mapping 52>ETL Level Mapping 54>Estimated ETL Level Mapping 56 (that is, the degree of contribution of the column mapping 52 to the degree of similarity determination is higher). In addition, for example, the weighting may be performed in priority order of Column Mapping 52=ETL Level Mapping 54>Estimated ETL Level Mapping 56.

In addition, in the estimated ETL level mapping 56, the weighting may be performed such that the degree of similarity to be calculated by determining that there is the connectedness in the ETLs is distinguished from the degree of similarity to be calculated by determining that there is no connectedness in the ETL. For example, the weighting may be performed such that the weight coefficient with respect to the degree of similarity of the column mapping 52 and the ETL level mapping 54 is 1, the weight coefficient with respect to the degree of similarity to be calculated by determining that there is the connectedness in the ETLs in the estimated ETL level mapping 56 is 0.7, and the weight coefficient with respect to the degree of similarity to be calculated by determining that there is no connectedness in the ETLs in the estimated ETL level mapping 56 is 0.3.

Next, an example of a screen that is processed by the portal 21 and displayed to the user will be described with reference to FIG. 18 and FIG. 19. The common data model-corresponding candidate data presentation unit 32 is used for presenting the screen to the user, and the common data model-corresponding candidate data presentation unit 32 is executed by the central control unit 10 of the data management device 1.

Figure 18:
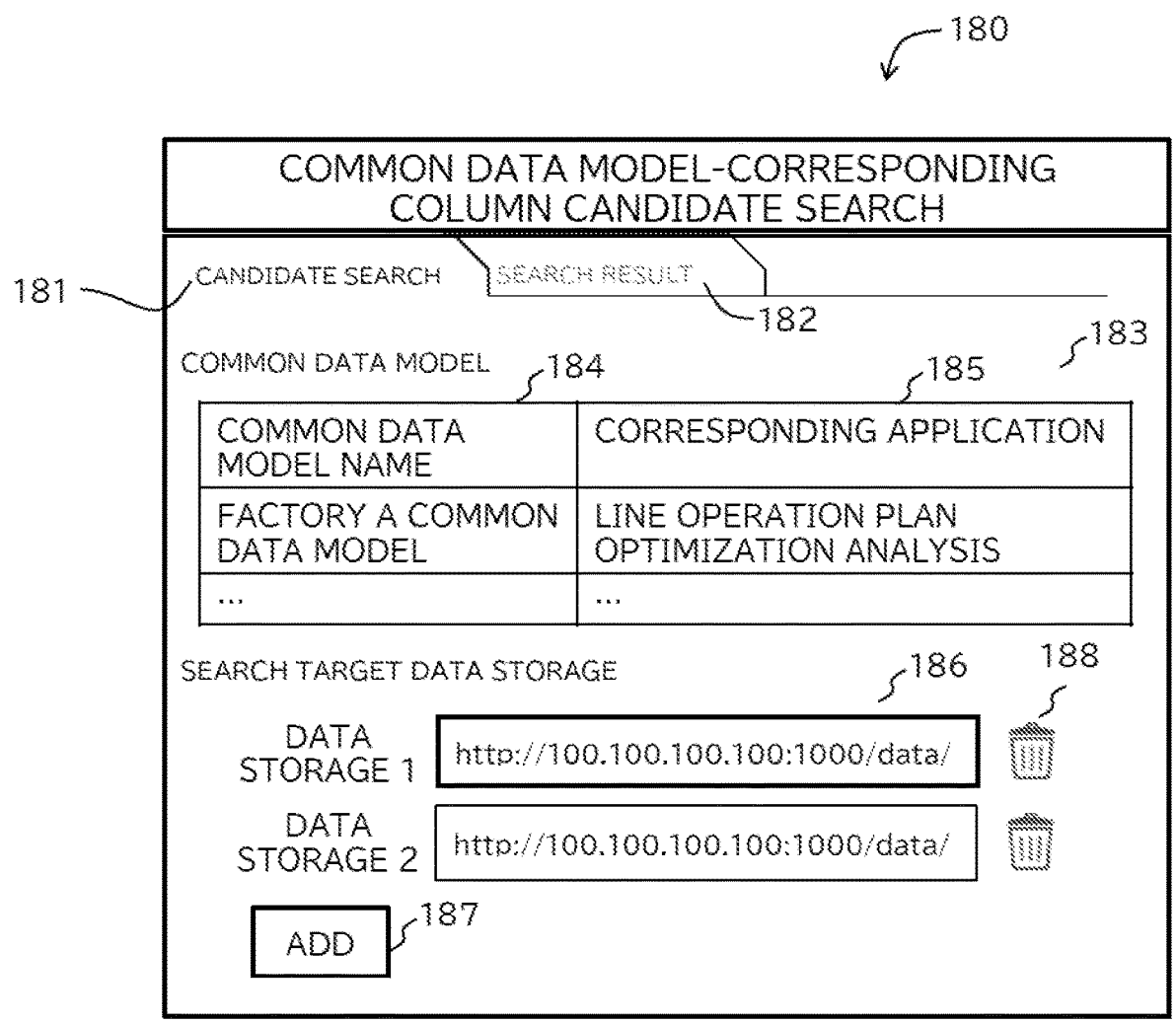
FIG. 18 is a diagram illustrating an example of a screen for receiving a common data model-corresponding data grasp request from a user.

FIG. 18 is an example of the screen that is used by the user to search the candidate of the retained data with respect to the common data model. In FIG. 18, a screen 180 of the portal 21 includes a page of a candidate search tab 181 and a search result tab 182. Then, in an area 183 for inputting the information of the common data model, the candidate search tab 181 includes information 184 of a common data model name to be searched, information 185 indicating the corresponding application of the common data model 184, information 186 indicating a storage place of a search target data storage, a button 187 for adding the data storage 186, and a deletion button 188. Here, the information 184 of the common data model name of the area 183 for inputting the common data model or the information 185 of the corresponding application may be listed, and may be in a format to be selected therefrom.

Figure 19:
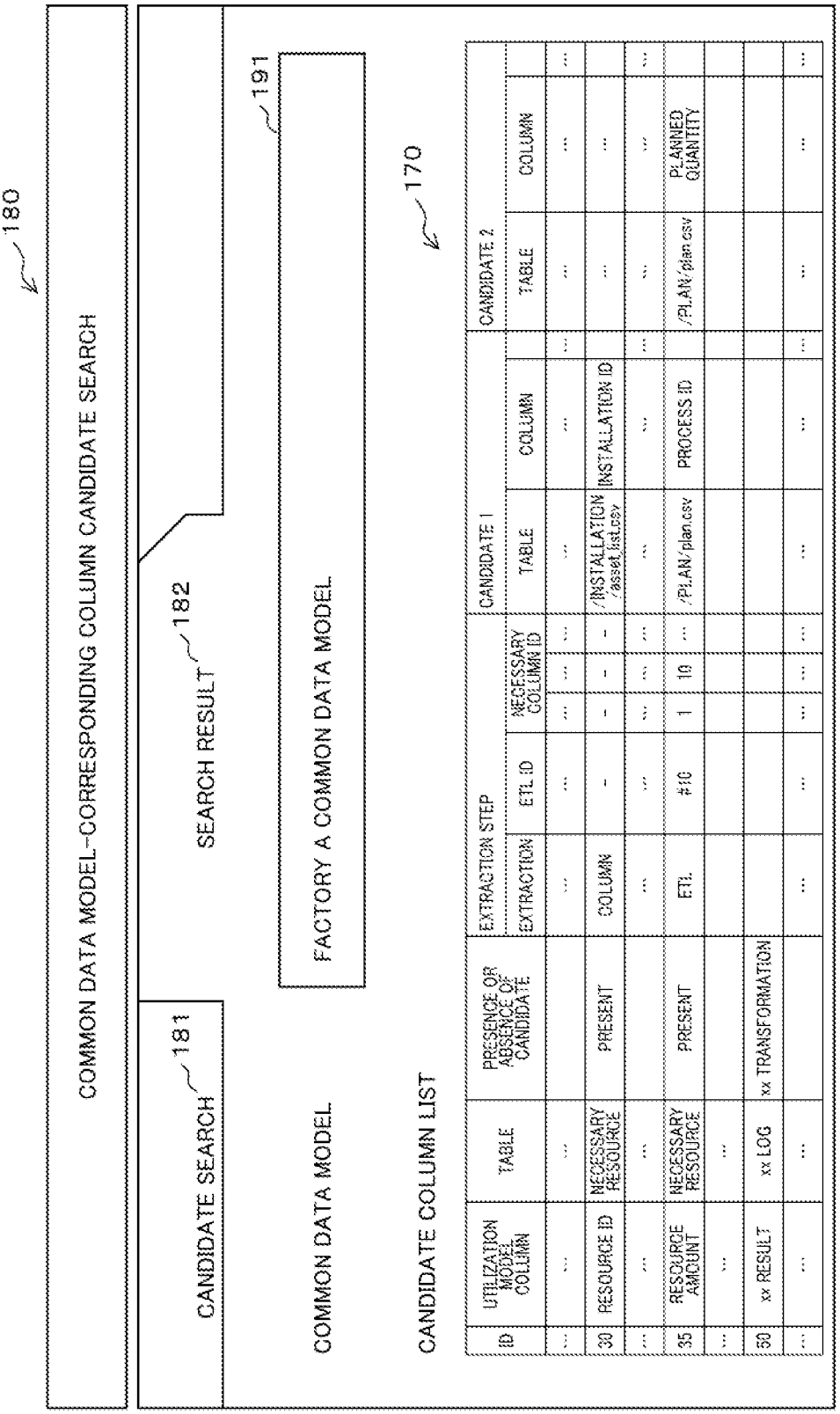
FIG. 19 is a diagram illustrating an example of a screen for presenting a candidate column list with respect to the common data model-corresponding data grasp request from the user.

FIG. 19 is an example of a screen for displaying a result of the common data model-corresponding data grasp support processing unit 20 based on the information input in FIG. 18 (in other words, information relevant to the utilization of the data based on the calculated degree of similarity). In the search result tab 182 of FIG. 19, information 191 indicating the common data model name input or selected in the area 183 of the candidate search tab 181, and the candidate column list 170 generated by the common data model-corresponding data grasp support processing unit 20 are displayed. The information relevant to the utilization of the data such as which data can be used or in which mapping processing the data is acquired can be grasped by the user referring to the candidate column list 170. Note that, the description of the display based on FIG. 18 and FIG. 19 is an example, and the mode of the display or the like may be suitably changed.

According to the embodiment described above, even in a case where it is estimated that there is a data processing flow (the ETL flow) that is not registered in the repository, the candidate of the retained data corresponding to the data model can be detected and acquired. That is, even in an environment where there is some data or data processing that is not shared, a verification range of the retained data with respect to the data model to be reused can be expanded, and thus, search man-hours of the user can be further reduced.

The embodiment has been described, but the invention is not limited to the embodiment described above, and includes various modification examples. For example, a part of the configuration of the embodiment can be subjected to the addition of other configurations, deletion, and substitution.

The metadata of the data that is used in the processing of the data utilization support system may be accumulated and shared in the repository, and the data utilization support system may perform the processing by using the metadata accumulated in the repository.

A CPU can be considered as an example of the central control unit 10 (a processor), but the central control unit 10 may be other semiconductor devices (for example, a GPU or the like) insofar as it is a subject executing predetermined processing.

What is claimed is:

1. A data management system supporting reuse of a data model by accumulating ETL relevant to an existing data model in a repository, the system comprising:
   a processor,
   wherein an estimated ETL level mapping processing unit is operated on the processor to estimate existence of unregistered ETL that is ETL not registered in the repository, to calculate a degree of similarity based on matching between the existing data model and retained data, and to extract a column to be a candidate for reuse based on the degree of similarity, and
   the estimated ETL level mapping processing unit estimates the presence or absence of connectedness in the ETLs on the basis of correspondence between input data and output data in the ETLs by using an execution ETL log relevant to an execution history of the ETL to estimate the existence of the unregistered ETL.

2. The data management system according to claim 1, wherein the estimated ETL level mapping processing unit acquires information of a Read/Write manipulation of the input data and the output data in the ETLs that are estimated not to have the connectedness by using an access log including an access history to the input data and the output data of the ETL,
   extracts data subjected to the Read manipulation among the acquired information, and determines that the data is the input data to the unregistered ETL on the basis of an extraction frequency,
   calculates the degree of similarity relevant to the unregistered ETL, and
   extracts the column to be the candidate based on the degree of similarity.

3. The data management system according to claim 1, wherein a column level mapping processing unit is operated on the processor to calculate a degree of similarity based on information of the column,
   an ETL level mapping processing unit is operated on the processor to calculate a degree of similarity based on information of the ETL registered in the repository, and
   a common data model-corresponding candidate data presentation unit is operated on the processor to present data of the column to be the candidate that is extracted on the basis of the calculated degree of similarity.

4. The data management system according to claim 3, wherein weighting for increasing weight in order of the degree of similarity that is calculated by processing of the estimated ETL level mapping processing unit, the degree of similarity that is calculated by processing of the ETL level mapping processing unit, and the degree of similarity that is calculated by processing of the column level mapping processing unit is performed, and
   the common data model-corresponding candidate data presentation unit presents information indicating which degree of similarity based on which processing is used to extract the column.

5. The data management system according to claim 3, wherein weighting for decreasing weight of the degree of similarity that is calculated by processing of the estimated ETL level mapping processing unit with respect to the degree of similarity that is calculated by processing of the column level mapping processing unit and the degree of similarity that is calculated by processing of the ETL level mapping processing unit is performed, and
   the common data model-corresponding candidate data presentation unit presents information indicating which degree of similarity based on which processing is used to extract the column.

6. A data management method using an electronic computer supporting reuse of a data model by accumulating ETL relevant to an existing data model in a repository, the method comprising:
   estimating existence of unregistered ETL that is ETL not registered in the repository, calculating a degree of similarity based on matching between the existing data model and retained data, and extracting a column to be a candidate for reuse based on the degree of similarity; and
   estimating the presence or absence of connectedness in the ETLs on the basis of correspondence between input data and output data in the ETLs by using an execution ETL log relevant to an execution history of the ETL to estimate the existence of the unregistered ETL.

7. The data management method according to claim 6, wherein information of a Read/Write manipulation of the input data and the output data in the ETLs that are estimated not to have the connectedness is acquired by using an access log including an access history to the input data and the output data of the ETL,
   data subjected to the Read manipulation is extracted among the acquired information, and it is determined that the data is the input data to the unregistered ETL on the basis of an extraction frequency,
   the degree of similarity relevant to the unregistered ETL is calculated, and
   the column to be the candidate based on the degree of similarity is extracted.

8. The data management method according to claim 6, wherein a degree of similarity is calculated by a method using information of the column,
   a degree of similarity is calculated by a method using information of the ETL registered in the repository, and
   data of the column to be the candidate that is extracted on the basis of the calculated degree of similarity is presented.

9. The data management method according to claim 8, wherein weighting for increasing weight in order of the degree of similarity that is calculated by a method for estimating the existence of the unregistered ETL, the degree of similarity that is calculated by the method using the information of the ETL registered in the repository, and the degree of similarity that is calculated by the method using the information of the column is performed, and information indicating which degree of similarity based on which method is used to extract the column is presented.

10. The data management method according to claim 8, wherein weighting for decreasing weight of the degree of similarity that is calculated by a method for estimating the existence of the unregistered ETL with respect to the degree of similarity that is calculated by the method using the information of the column and the degree of similarity that is calculated by the method using the information of the ETL registered in the repository is performed, and information indicating which degree of similarity based on which method is used to extract the column is presented.

11. A program for allowing an electronic computer to execute the data management method according to claim 6.

\* \* \* \* \*